(12) United States Patent
Maevert

(10) Patent No.: US 8,876,205 B2
(45) Date of Patent: Nov. 4, 2014

(54) SAFETY SEAT, SUSPENDED IN A MOUNTING FRAME, FOR LAND VEHICLES, AIRCRAFT AND WATERCRAFT

(75) Inventor: Mario Maevert, Nienstaedt (DE)

(73) Assignee: Autoflug GmbH, Rellingen (DE)

(*) Notice: Subject to any disclaimer, the term of this patent is extended or adjusted under 35 U.S.C. 154(b) by 83 days.

(21) Appl. No.: 13/702,943

(22) PCT Filed: Jun. 6, 2011

(86) PCT No.: PCT/EP2011/059255
§ 371 (c)(1),
(2), (4) Date: Feb. 13, 2013

(87) PCT Pub. No.: WO2011/154340
PCT Pub. Date: Dec. 15, 2011

(65) Prior Publication Data
US 2013/0234480 A1    Sep. 12, 2013

(30) Foreign Application Priority Data

Jun. 8, 2010 (DE) .......................... 10 2010 023 065

(51) Int. Cl.
| | |
|---|---|
| *B60N 2/42* | (2006.01) |
| *B60N 2/427* | (2006.01) |
| *B60N 2/24* | (2006.01) |
| *B60N 2/50* | (2006.01) |
| *B63B 29/04* | (2006.01) |
| *B64D 11/06* | (2006.01) |
| *B64D 25/02* | (2006.01) |
| *B64D 25/06* | (2006.01) |

(52) U.S. Cl.
CPC .............. *B60N 2/4242* (2013.01); *B60N 2/427* (2013.01); *B60N 2/24* (2013.01); *B60N 2/503* (2013.01); *B63B 29/04* (2013.01); *B64D 11/06* (2013.01); *B64D 25/02* (2013.01); *B64D 25/06* (2013.01); *B64D 2011/0668* (2013.01)
USPC .................................... 297/216.16; 297/216.1

(58) Field of Classification Search
USPC ................ 297/216.1, 216.13, 216.16; 296/63
See application file for complete search history.

(56) References Cited

U.S. PATENT DOCUMENTS

| | | | | |
|---|---|---|---|---|
| 2,829,702 | A * | 4/1958 | Keating ...................... | 297/183.9 |
| 3,314,720 | A * | 4/1967 | Millington et al. ......... | 297/216.1 |
| 3,868,143 | A * | 2/1975 | Reilly ....................... | 297/216.17 |
| 4,474,347 | A * | 10/1984 | Mazelsky .................. | 244/122 R |

(Continued)

FOREIGN PATENT DOCUMENTS

| | | | |
|---|---|---|---|
| DE | 102008005422 | * | 10/2008 |
| EP | 2135770 | * | 12/2009 |

*Primary Examiner* — Philip Gabler
(74) *Attorney, Agent, or Firm* — Jennifer S. Stachniak; Robert W. Becker

(57) ABSTRACT

A safety seat for land vehicles, aircraft and watercraft, having a seat part frame, and a backrest frame suspended on a restraint or suspension strap firmly attached to the vehicle, wherein the backrest frame has a lateral or transverse strut, and an additional holding strap clamps the lateral strut in. A separate mounting frame is provided to fix the restraint strap and the holding strap, and can be mounted in the vehicle, wherein bushing or guide-through eyes and attachment eyes for stretching the restraint strap and the holding strap are provided on the oppositely disposed lateral or transverse supports of the mounting frame, and wherein the holding strap is formed integrally, is fixed by its two ends to two attachment eyes, and is looped through, and passed back and forth between, a plurality of bushing eyes.

13 Claims, 1 Drawing Sheet

(56) References Cited

U.S. PATENT DOCUMENTS

| | | | |
|---|---|---|---|
| 6,481,777 B2* | 11/2002 | Mans | 296/68.1 |
| 6,913,314 B2* | 7/2005 | Hansen | 297/216.1 |
| 7,758,095 B2* | 7/2010 | Elhanany | 296/63 |
| 2008/0231068 A1* | 9/2008 | Elhanany | 296/63 |
| 2010/0253109 A1* | 10/2010 | Elhanany | 296/63 |
| 2010/0283298 A1* | 11/2010 | Hansen | 297/216.16 |

\* cited by examiner

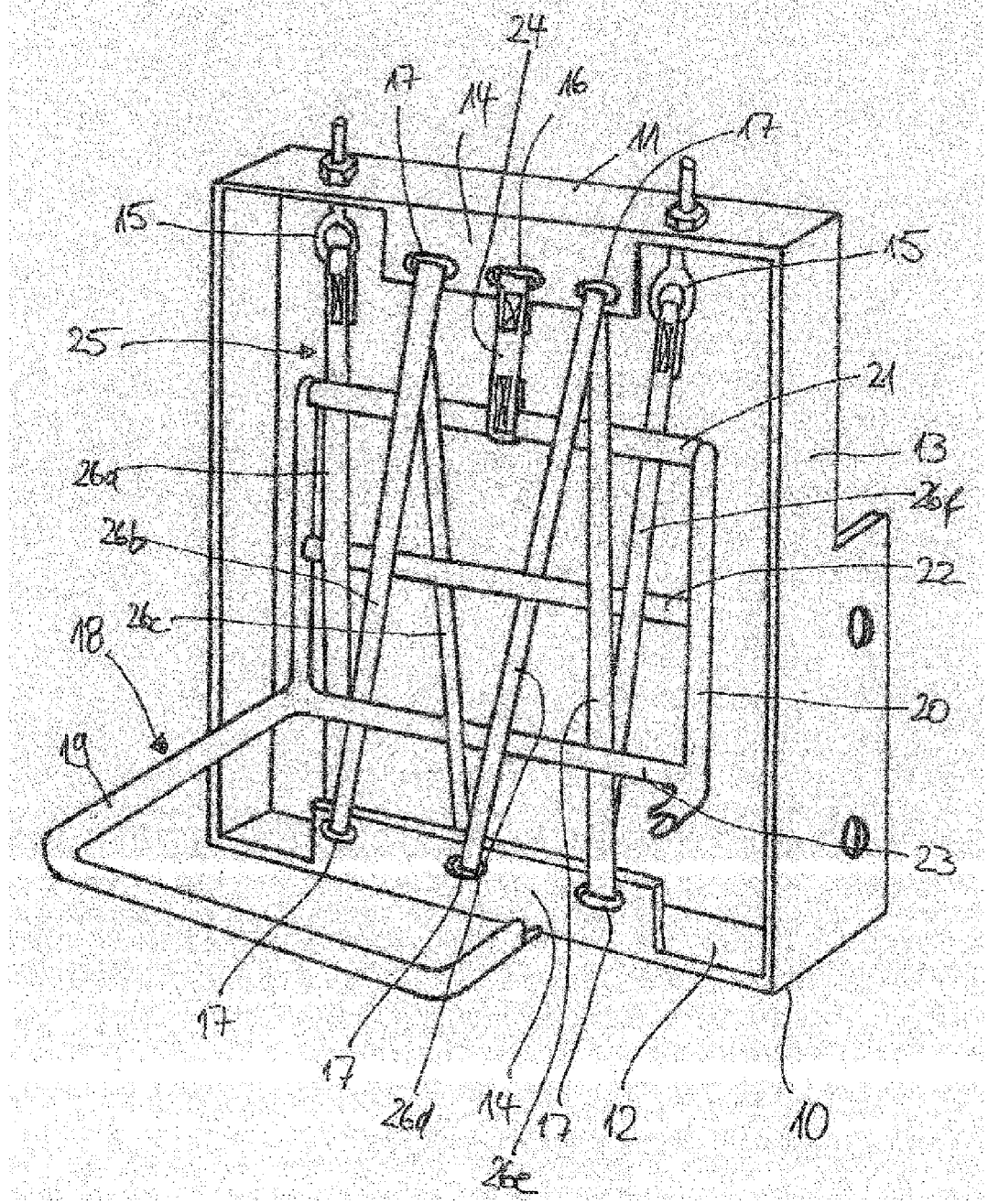

SAFETY SEAT, SUSPENDED IN A MOUNTING FRAME, FOR LAND VEHICLES, AIRCRAFT AND WATERCRAFT

The instant application should be granted the priority dates of Jun. 8, 2010, the filing date of the corresponding German patent application 10 2010 023 065.0, as well as Jun. 6, 2011, the filing date of the International patent application PCT/EP2011/059255.

BACKGROUND OF THE INVENTION

The present invention relates to a safety seat for land vehicles, aircraft and watercraft, having a seat part frame that forms a seat part, and having a backrest frame that forms a backrest and is connected to the seat part frame, whereby the backrest frame is suspended on at least one suspension or restraint strap that is secured to an anchor that is mounted in the vehicle and is disposed vertically above the safety seat, and whereby additionally at least one holding or securing strap, which is stretched between anchors that are mounted in the vehicle and are vertically spaced from one another, is disposed in such a way that the holding strap is guided over at least one lateral or transverse strut formed on the backrest frame, and in particular is alternatingly guided on the front side of the strut that faces the seat part and the back side of the strut that faces away from the seat part, and as a result said transverse strut is clamped between the securing strap sections.

A safety seat having the aforementioned features is described in DE 10 2008 005 422 B3 (US 2010-0283298 A1). The safety seat explained therein has its backrest frame fixed in position on two loop-like securing straps that are stretched vertically between anchors mounted in the vehicle on the vehicle roof and on the floor of the vehicle, in that the front strap, which faces the safety seat, and the correspondingly extending rear strap that is spaced therefrom, of the securing strap loop are respectively alternatingly guided over the upper and lower transverse struts of the backrest frame in such a way that when the strap loops are tensioned, the front strap and the rear strap clamp the transverse struts between them. In addition, the backrest frame is suspended on a suspension strap that is secured to an anchor that is mounted in the vehicle and is disposed vertically above the safety seat. In so doing, the holding forces applied by means of the clamping of the transverse struts of the backrest frame via the securing straps in principle already suffice to fix the safety seat in position on the vertical securing straps without further components. This advantageously ensures that impacts or shocks that act in the vertical direction, in other words in the "z" direction of a vehicle, and that are caused, for example, by mine explosions, are absorbed by the securing strap loops as well as by the suspension strap. On the whole, an increase in the vertical forces that act upon the safety seat therefore results in only a very slight vertical change in the position of the safety seat, whereby a dampening of the applied vertical forces occurs due to the elongation characteristics of the strap that is used.

However, the known safety seat, or its installation into a vehicle, has the drawback that the individual securing straps and suspension straps that are associated with each safety seat are expensive to install in, or remove from, the vehicle if the vehicle is to be provided for a different use.

It is therefore an object of the present invention to provide a safety seat of the aforementioned general type that can be easily and hence rapidly installed into or removed from a vehicle.

SUMMARY OF THE INVENTION

The basic concept of the present invention is that for fixing the suspension strap and securing strap in position, a separate mounting frame is provided that can be mounted in the vehicle, whereby bushing or guide-through eyes and attachment eyes are formed on the oppositely disposed lateral supports or transverse support members of the mounting frame for the stretching or mounting of suspension strap and securing strap, and the backrest frame, in addition to its outwardly disposed transverse struts, is provided with a central transverse strut disposed between them, and that the integrally or monolithically formed securing strap has its two ends secured to two respectively outwardly disposed attachment eyes that are secured to the upper transverse support member of the mounting frame, and the securing strap is looped through, and guided back and forth between, three guide-through eyes that are disposed on the floor side, lower transverse support member of the mounting frame, and two guide-through eyes that are disposed on the upper transverse support member on the mounting frame, to thereby form six securing strap sections that run or extend between the upper and the lower transverse support members of the mounting frame, whereby at least some of the securing strap sections are alternatingly guided over the front side and the rear side of the three transverse struts formed on the backrest frame to apply or exert an appropriate clamping effect.

The present invention first of all has the advantage that due to the arrangement of the securing strap and suspension strap on a mounting frame, it is merely necessary to install this mounting frame into, or remove it from, the vehicle, whereby the dimensioning and configuration of the mounting frame can be adapted to the space conditions that are available in a vehicle. In this connection, it is possible, for example, to provide an individual, small mounting frame for each seat. However, it is also within the scope of the inventive concept to provide a larger configured mounting frame in which a plurality of safety seats can then be disposed and clamped by the associated securing straps.

Furthermore, the clamping effect of the securing strap is increased in that the backrest, in addition to the outwardly disposed transverse struts, is provided with a central transverse strut that is disposed between them. Finally, the belt arrangement is also inventively simplified in that the securing strap has a monolithic configuration, and is guided back and forth between attachment eyes and guide-through eyes that are appropriately mounted on the oppositely disposed transverse support members of the mounting frame. In so doing, the securing strap forms six securing strap sections that respectively extend between the upper transverse support member and the lower transverse support member of the mounting frame, and of which at least some are utilized to exert an appropriate clamping action.

Pursuant to a first exemplary embodiment of the invention, the two attachment eyes and the two guide-through eyes on the upper transverse support member on the mounting frame, as well as the two outer guide-through eyes on the lower transverse support member of the mounting frame, can be respectively disposed in an alignment perpendicular to the backrest frame, and the third guide-through eye of the lower transverse support member of the mounting frame can be disposed centrally therebetween, all in such a way that the two respectively outwardly disposed securing strap sections extend parallel to one another, and the two central securing strap sections produce a V-shaped path.

Alternatively, the two guide-through eyes disposed on the upper transverse support member of the mounting frame between the outwardly disposed attachment eyes, and the three guide-through eyes disposed on the lower transverse support member of the mounting frame, can be respectively disposed offset from one another, so that the six securing strap sections respectively have an oblique-angled path relative to the transverse support members of the mounting frame.

With respect to the clamping effect that is to be introduced, it is possible in this connection for the securing strap sections that proceed from the two attachment eyes, as well as for the securing strap sections that during the progress of the securing strap extend from the upper guide-through eyes to the lower guide-through eyes, to respectively be guided alternatingly over the front side and the rear side of the three transverse struts of the backrest frame, whereas the securing strap sections that during the progress of the securing strap extend from the lower guide-through eyes to the upper guide-through eyes extend without engagement of the transverse struts of the backrest frame.

Alternatively, again the securing strap sections that proceed from the two attachment eyes, as well as the securing strap sections that during the progress of the securing strap extend from the upper guide-through eyes to the lower guide-through eyes, can respectively be alternatingly guided over the front side and the rear side of the three transverse struts of the backrest frame, whereas however now the securing strap sections that during the progress of the securing strap extend from the lower guide-through eyes to the upper guide-through eyes are alternatingly guided only over the lower and the central transverse struts of the backrest frame. This can further improve the clamping effect of the securing strap sections relative to the backrest frame.

Finally, with respect to a maximum clamping effect, alternatively all six of the securing strap sections that extend between the upper and the lower transverse support members of the mounting frame can be alternatingly guided over the front and rear sides of the three transverse struts of the backrest frame.

Pursuant to one exemplary embodiment of the invention, the attachment eye for the suspension strap is centrally disposed on the upper transverse support member of the mounting frame, and the suspension strap is attached to the upper transverse strut of the backrest frame. Alternatively, the suspension strap can be secured to the central transverse strut of the backrest frame, whereby as an additional measure, the suspension strap can additionally be looped about the upper transverse strut of the backrest frame.

In this connection, a tensioning device can be disposed in the path of the suspension strap in order to improve the fixing of the safety seat in position on the mounting frame.

With respect to the guiding of the monolithic or one-piece securing strap back and forth several times between the guide-through eyes, it is possible pursuant to one exemplary embodiment of the invention for the guide-through eyes that are disposed on the transverse support members of the mounting frame to be embodied as slots that are respectively provided in the profile of the transverse support members.

Alternatively, the guide-through eyes that are disposed on the transverse support members of the mounting frame can be embodied as retaining clips or loops that are secured to the transverse support members.

To enable a tensioning of the one-piece securing strap, at least one of the attachment eyes can be embodied as a tensioning screw or turnbuckle; alternatively, both attachment eyes could also be in the form of tensioning screws or turnbuckles.

BRIEF DESCRIPTION OF THE DRAWINGS

One exemplary embodiment of the invention is illustrated in the drawing, which is described subsequently. The sole FIGURE shows a mounting frame with a safety seat that is suspended therein by means of a suspension strap and a monolithic or one-piece securing strap.

DESCRIPTION OF SPECIFIC EMBODIMENTS

To support a safety seat arranged in a manner corresponding to the aforementioned DE 10 2008 005 422 B3, a mounting frame 10 is provided that is to be placed in a non-illustrated vehicle, and to be installed or mounted therein; the mounting frame is comprised of an upper transverse support member 11, a lower transverse support member 12 that is associated with the floor of the vehicle, and side walls 13 that extend between the support members. In the illustrated embodiment, a safety seat 18 is supported in this mounting frame 10 in a manner to be described subsequently. However, it can also be possible to dimension the mounting frame 10 in such a way that a plurality of such safety seats 18 can be disposed in the mounting frame 10. To this extent, making the mounting frame 10 available for the at least one safety seat 18 has the advantage that for the installation of the safety seat 18 into a vehicle, it is merely necessary to place the mounting frame or frames 10 into the vehicle and to anchor them therein. To the extent that the safety seat 18 is to be fixed in position in a manner in accordance with the aforementioned document by means of a suspension strap 24 and a holding or securing strap 25, inwardly extending flanges 14 are provided on the upper transverse support member 11 and the lower transverse support member 12 of the mounting frame 10 respectively. Appropriate attachment eyes 16 and guide—through eyes 17 are provided in the flanges in the form of slots that are disposed in the flanges 14. In addition, respective outwardly disposed attachment eyes 15 in the form of bolted fixtures are provided on the upper transverse support member 11, whereby at least one bolted fixture can also be embodied as a tensioning screw or turnbuckle.

The safety seat 18 that is suspended in the mounting frame 10 is, in a known manner, comprised of a seat frame 19 and a backrest frame 20 having an upper transverse strut 21 and a lower transverse strut 23, whereby the lower transverse strut 23 also forms a part of the seat frame 19. In addition, a further central transverse strut 22 is disposed in the mounting frame 20 between the upper transverse strut 21 and the lower transverse strut 23.

A safety seat 18 configured in such a manner is initially suspended by means of a suspension strap 24 that is looped about the upper transverse strut 21 of the backrest frame 20, and is guided through the central, upper attachment eye 16 of the upper transverse support member 11 of the mounting frame 10. Although not illustrated, it would also be possible for the suspension strap 24 to be secured in position on the central transverse strut 22 and to loop about the upper transverse support member in its path to the upper attachment eye 16. In particular, with such a configuration it would be possible to provide a non-illustrated tensioning device in the path of the suspension strap 24.

To fix the safety seat 18 in position, and in particular by its backrest frame 20 using the clamping effect of the securing strap 25 in a manner described in principle in DE 10 2008 005 422 B3, the securing strap 25 has a one-piece or monolithic construction, and is guided back and forth several times between the attachment eyes 15 and the guide-through eyes 17 respectively that are formed on the transverse support members 11 and 12 of the mounting frame 10, so that a total of six securing straps sections or runs 26a through 26f result. Beginning at the left side of the mounting frame 10 with the safety seat 18 illustrated in the drawing, the one end of the securing strap 25 is secured to the outer attachment eye 15, and from there extends via a first securing strap section 26a to the outer, oppositely disposed guide-through eye 17, whereby the securing strap section 26a alternatively extends on the back side of the upper transverse strut 21, over the front side of the central transverse strut 22 and the back side of the lower transverse strut 23; after changing direction in the guide-through eye 17, a second securing strap section 26b of the securing strap 25 extends in the direction of a guide-through eye 17 formed on the flange 14 of the upper transverse support member 11, whereby the securing strap section 26b, in its path from the back side of the lower transverse strut 23, changes only one time to the front side of the central transverse strut 22, and from there extends directly to the upper guide-through eye 17. After changing direction, following the upper guide-through eye is a third securing strap section 26c, which, in correspondence with the securing strap section 26a, alternating extends between the front and rear side of all three transverse struts 21, 22, 23 to a lower guide-through eye 17. The following fourth securing strap section 26d again has a path that alternating engages or captures all three transverse struts, while after a change in direction in the subsequent upper guide-through eye 17, the path of the following, fifth securing strap section 26e corresponds to that of the securing strap section 26b in that the alternating path includes only the central transverse strut 22 and the lower transverse strut 23. The path of the sixth, again outwardly disposed securing strap section 26f, the end of which is secured to the outwardly disposed, outer attachment eye 15 of the upper transverse support member 11, corresponds to that of the securing strap section 26a, and as it is guided over the front side and rear side respectively of the transverse struts includes or captures all three transverse struts 21, 22, and 23.

The features of the subject matter of these documents disclosed in the preceding description, the patent claims, the abstract and the drawing can be important individually as well as in any combination with one another for realizing the various embodiments of the invention.

The specification incorporates by reference the disclosure of German 10 2010 023 065.0 filed Jun. 8, 2010, as well as International application PCT/EP2011/059255 filed Jun. 6, 2011.

The present invention is, of course, in no way restricted to the specific disclosure of the specification and drawings, but also encompasses any modifications within the scope of the appended claims.

The invention claimed is:

1. A safety seat system for land vehicles, aircraft and watercraft, comprising:
   a seat frame that forms a sitting part;
   a backrest frame that forms a backrest and is connected to said seat frame to form a safety seat, wherein said backrest frame is comprised of oppositely disposed transverse struts and a central transverse strut disposed between said oppositely disposed transverse struts;
   a mounting frame configured to be secured in a vehicle or craft, wherein said mounting frame is comprised of oppositely disposed transverse support members interconnected by side walls, and wherein guide-through eyes and attachment eyes are provided on said transverse support members;
   at least one suspension strap secured to an upper one of said oppositely disposed transverse struts as well as to at least one of said attachments eyes to suspend said safety seat on said mounting frame;
   a single, monolithic securing strap having two ends, each of which is secured to a respective outwardly disposed one of said attachment eyes on an upper one of said transverse support members of said mounting frame, wherein said securing strap is furthermore looped through three of said guide-through eyes on a lower one of said transverse support members of said mounting frame and through two of said guide-through eyes on said upper transverse support member, further wherein said securing strap is guided back and forth between said guide-through eyes to thereby form six securing strap sections that extend between said upper and lower transverse support members of said mounting frame, and wherein at least some of said securing strap sections are alternatingly guided over opposite sides of said three transverse struts of said backrest frame to apply a clamping effect upon said transverse struts.

2. A safety seat system according claim 1, wherein said two attachment eyes to which said securing strap is secured, and said two guide-through eyes on said upper transverse support member of said mounting frame, as well as two outer ones of said guide-through eyes on said lower transverse support member of said mounting frame are respectively guided in an alignment perpendicular to said backrest frame and wherein the third guide-through eye of said lower transverse support member of said mounting frame is disposed centrally between the other two guide-through eyes of said lower transverse support member, all in such a way that two respectively outwardly disposed ones of said securing strap sections extend parallel to one another, while two central ones of said securing strap sections produce a V-shaped path.

3. A safety system seat according to claim 1, wherein said two guide-through eyes disposed on said upper transverse support member of said mounting frame and between said outwardly disposed attachment eyes, and said three guide-through eyes that are disposed on said lower transverse support member of said mounting frame, are respectively disposed offset relative to one another, so that said six securing strap sections respectively have an oblique-angled path relative to said transverse support members of said mounting frame.

4. A safety seat system according to claim 1, wherein those securing straps sections (26a, 26f) that proceed from said two attachment eyes, as well as those securing straps sections that during the progress of said securing strap extend from the upper guide-through eyes to the lower guide-through eyes, are respectively alternatingly guided over a front side and a rear side of said three transverse struts of said backrest frame, whereas those securing strap sections that during the progress of said securing strap extend from the lower guide-through eyes to the upper guide-through eyes without engaging said transverse struts of said backrest frame.

5. A safety seat system according to claim 1, wherein those securing straps sections that proceed from said two attachment eyes, as well as those securing straps sections that during the progress of said securing strap extend from the upper guide-through eyes to the lower guide-through eyes, are respectively alternatingly guided over a front side and a rear side of said three transverse struts of said backrest frame, whereas those securing strap sections that during the course of said securing strap extend from the lower guide-through eyes to the upper guide-through eyes are alternatingly guided over only said lower and said central transverse struts of said backrest frame.

6. A safety seat system according to claim 1, wherein all six of said securing strap sections that extend between said upper and lower transverse support members of said mounting frame are alternatingly guided over a front side and a rear side of said three transverse struts of said backrest frame.

7. A safety seat system according to claim 1, wherein said attachment eye for said suspension strap is disposed centrally on said upper transverse support member of said mounting frame, and wherein said suspension strap is attached to said upper transverse strut of said backrest frame.

8. A safety seat system according to claim 1, wherein said attachment eye for said suspension strap is centrally disposed on said upper transverse support member of said mounting frame, and wherein said suspension strap is attached to said central transverse strut of said backrest frame.

9. A safety seat system according to claim 8, wherein said suspension strap is additionally looped about said upper transverse strut of said backrest frame.

10. A safety seat system according to claim 1, wherein a tensioning device is disclosed in the path of said suspension strap.

11. A safety seat system according to claim 1, wherein said guide-through eyes disposed on said transverse support members of said mounting frame are embodied as slots disposed in a profile of said transverse support members.

12. A safety seat system according to claim 1, wherein said guide-through eyes disposed on said transverse support members of said mounting frame are embodied as retaining clips or loops secured to said transverse support members.

13. A safety seat system according to claim 1, wherein at least one of said attachment eyes to which said securing strap is secured is embodied as a tensioning screw or turnbuckle.

* * * * *